United States Patent [19]

Shellhause

[11] Patent Number: 4,573,249

[45] Date of Patent: Mar. 4, 1986

[54] METHOD OF MANUFACTURING BRAKE SHOE ASSEMBLY

[75] Inventor: Ronald L. Shellhause, Vandalia, Ohio

[73] Assignee: General Motors Corporation, Detroit, Mich.

[21] Appl. No.: 672,667

[22] Filed: Nov. 19, 1984

Related U.S. Application Data

[62] Division of Ser. No. 539,107, Oct. 5, 1983.

[51] Int. Cl.$^4$ ............................................. B23P 11/00
[52] U.S. Cl. ...................................... 29/432; 29/463;
29/526 A; 188/250 C; 228/182
[58] Field of Search ...................... 29/432, 463, 526 R;
188/1.11, 331, 326, 250 B, 250 C, 250 D;
228/182

[56] References Cited

U.S. PATENT DOCUMENTS

| | | | |
|---|---|---|---|
| 1,771,594 | 7/1930 | Thompson | 188/250 C UX |
| 1,810,923 | 6/1931 | Mooers | 188/250 C X |
| 1,915,857 | 6/1933 | Loughead | 188/250 D X |
| 2,426,116 | 8/1947 | Oetzel | 188/250 C |
| 2,658,473 | 11/1953 | Hunt | 188/250 C |
| 3,334,394 | 8/1967 | Bell | 29/432 X |
| 4,360,959 | 11/1982 | Johannesen | 188/250 C X |

FOREIGN PATENT DOCUMENTS 1242605  8/1960  France ............................ 188/250 B Primary Examiner—Charlie T. Moon
Attorney, Agent, or Firm—D. D. McGraw

[57] ABSTRACT

The disclosed method involves making a brake shoe from symmetrical halves by placing a formed lining segment in position on laterally spaced brake shoe half sections with forces applied thereto to engage serrations in the shoe web half sections, forcing the shoe half sections together to form a full shoe while concurrently moving the serrations across the lining segment to form mating serrations on the lining segment and thereby provide serrated mating engagement of the serrated shoe rim with the lining segment. Lining segment retaining means formed on the shoe web half sections engage and hold the lining segment on the assembled shoe, the shoe rim half sections being secured together by fastening means which may be rivets or spot welds, by way of example.

4 Claims, 6 Drawing Figures

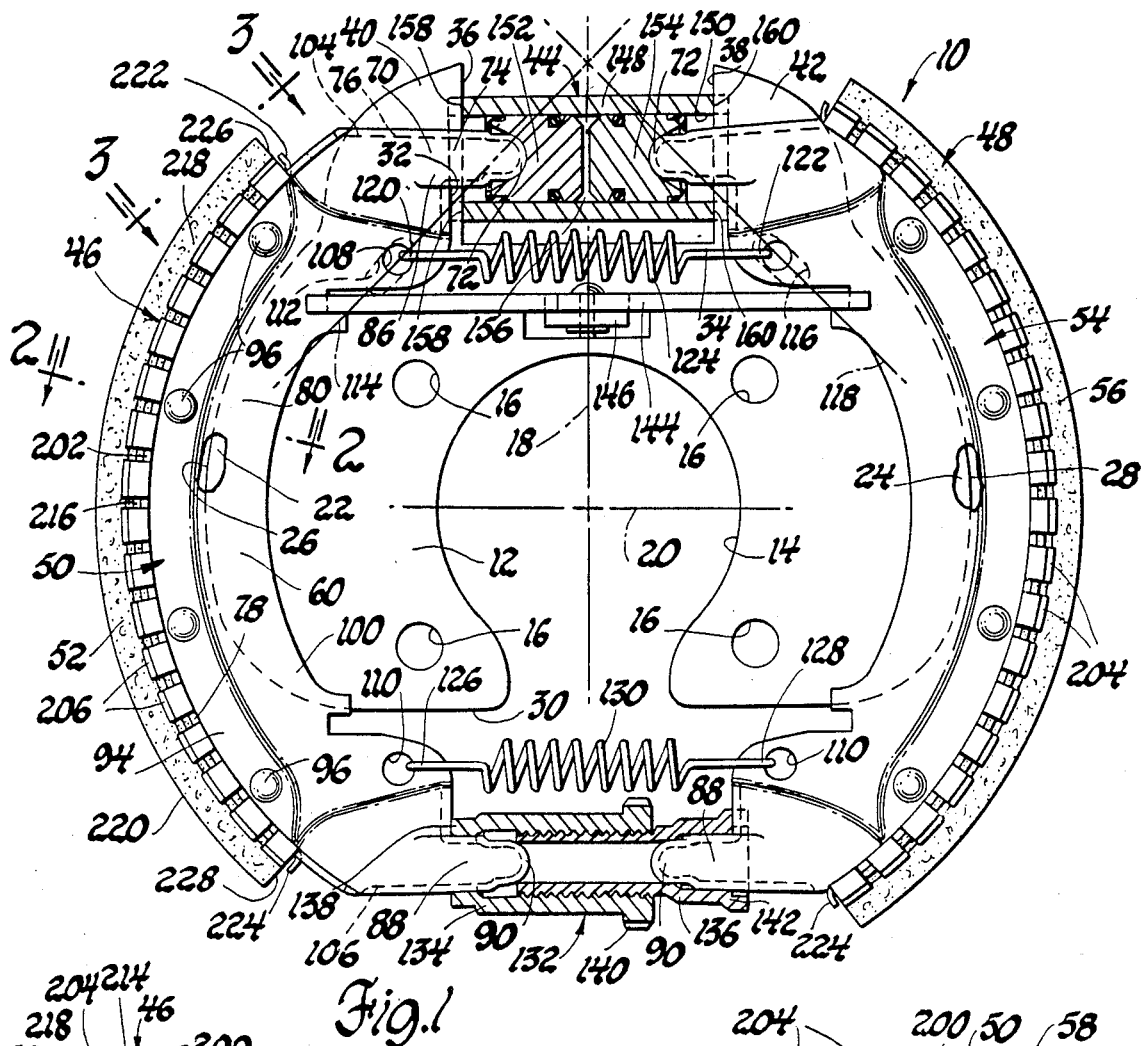
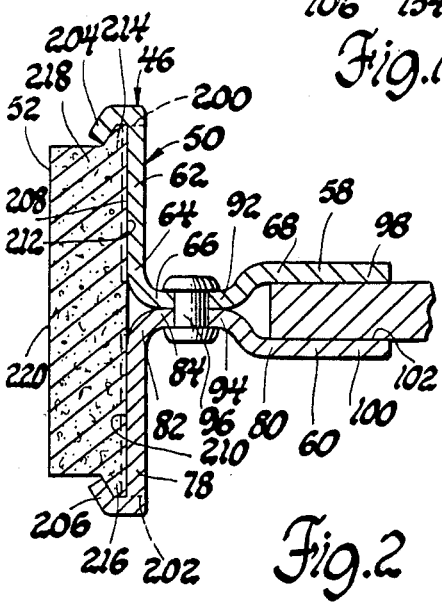
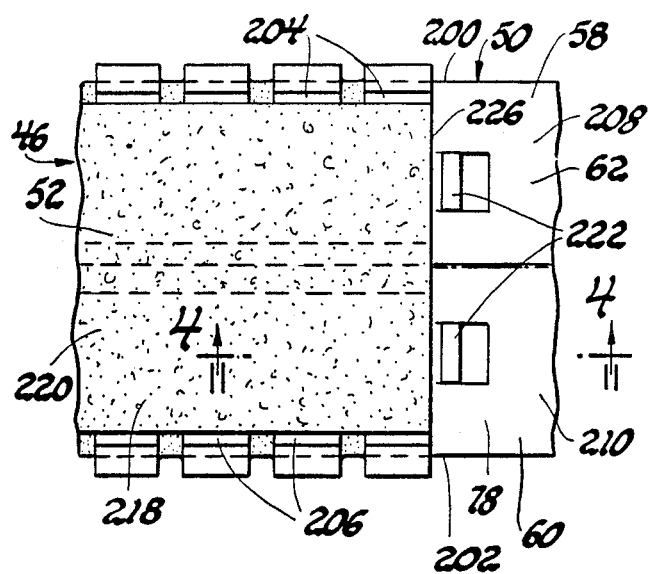
Fig.1
Fig.2
Fig.3

METHOD OF MANUFACTURING BRAKE SHOE ASSEMBLY

This is a division of Ser. No. 539,107, filed on Oct. 5, 1983.

The invention relates to a method of manufacturing brake shoe assembly for an automotive vehicle brake. The shoes made by the method form a part of a brake assembly in which an open backing plate provides a center guide mount for a pair of the brake shoe assemblies. They fit over the edge portions of the backing plate and require no additional mounting other than retraction springs. Each brake shoe assembly includes a lining segment and a shoe, the shoe being made in halves which are completely symmetrical. The shoe halves are secured together in matching relation to form a complete rim and web, with spherical ends which serve as push rods by engaging the wheel cylinder pistons and also engage and locate the brake adjuster.

It is a feature of the invention to make a brake shoe from symmetrical halves, place a formed lining segment in position on laterally spaced brake shoe half sections with forces applied thereto to engage serrations in the shoe web half sections, force the shoe half sections together to form a full shoe while concurrently moving the serrations across the lining segment to scarify the lining segment and thereby provide serrated mating engagement of the serrated shoe rim with the lining segment, with lining segment retaining means formed on the shoe web half sections engaging and holding the lining segment on the assembled shoe, the shoe rim half sections being secured together by fastening means which may be rivets or spot welds, by way of example.

Brake shoes made by the method herein disclosed and claimed are an improvement on the brake shoes disclosed and claimed in Applicant's U.S. Pat. No. 3,616,880, entitled "Floating Anchor-Cylinder Drum Brake with Adjuster" and issued Nov. 2, 1971.

The drum brake assembly 10 has a backing plate 12 which also functions as a center guide for the brake shoe assemblies and the wheel cylinder assembly. The backing plate 12 has a keyhole shaped center opening 14 through which a vehicle drive axle, not shown, may extend. It is also provided with several apertures 16, four such apertures being illustrated, through which mounting bolts are inserted to bolt the backing plate 12 to a fixed mounting flange, not shown. The mounting flange, as is well known in the art, may be secured to the outer end of a vehicle rear axle housing. If the brake is used on the front axle of a vehicle, the backing plate 12 is bolted to suitable portions of a steering knuckle and the stub axle extends through opening 14. The backing plate is symmetrically formed about the backing plate first diameter 18, which is the vertical diameter as seen in FIG. 1. A backing plate second diameter 20 is at right angles to diameter 18 and extends horizontally as seen in FIG. 1. The opposite portions of the backing plate through which diameter 20 extends provide arcuate backing plate sections 22 and 24 respectively having edge surfaces 26 and 28. The backing plate extends downwardly about diameter 18 slightly below the lower bolt apertures 16 and terminates in a chordal edge 30 through which the open part of opening 14 extends. The backing plate also extends upwardly along diameter 18, terminating in a notch 32 opening upwardly. The notch has a lower edge 34 which, like chordal edge 30, may be parallel to diameter 20, and side edges 36 and 38.

The backing plate has arm-like extensions 40 and 42 respectively defining edges 36 and 38 and extending outwardly from the arcuate sections 22 and 24 to provide for mounting and guiding the wheel cylinder assembly 44, which is received within notch 32. Extensions 40 and 42 also extend through openings in the brake shoe assemblies to be described.

Brake shoe assemblies 46 and 48 are respectively received on the backing plate arcuate sections 22 and 24. The precise mounting arrangement will be described in detail below. Brake shoe assembly 46 includes a brake shoe 50 and a brake lining segment 52. Brake shoe assembly 48 includes an identical brake shoe 54 and a similar lining segment 56. The lining segments 52 and 56 may be identical if the same friction braking area is to be provided for as brake shoe assembly. However, it is usual to provide a brake lining segment having smaller friction braking surface area on the primary shoe assembly and a larger friction braking surface area on the secondary shoe assembly. Thus, in the brake assemblies of FIG. 1, brake shoe assembly 46 is a primary brake shoe assembly of a duo-servo brake. If a leading/trailing arrangement is used, the lining segments 52 and 56 may have the same friction braking surface area. The same is true if wheel cylinders are used at opposite ends of the brake shoe assemblies.

As is better illustrated in FIGS. 2, 3, 5 and 6, the brake shoe 50 of shoe assembly 46 is constructed in identical halves defined by shoe sections 58 and 60. The same is true of shoe 54. While only brake shoe assembly 46 is described below in further detail, the same description applies to brake shoe assembly 48 and the same reference characters are used on that assembly for identical parts hereinafter described.

It is another feature of the invention to make a brake shoe with identical, symmetrical shoe half sections which are mated and secured together to make a complete brake shoe which has integral lining segment retention means, thus requiring no lining segment rivets or adhesive.

IN THE DRAWINGS

FIG. 1 is an elevation view of a drum brake assembly embodying the invention, with parts broken away and in section.

FIG. 2 is a fragmentary cross-section view of one brake shoe assembly, taken in the direction of arrows 2—2 of FIG. 1 and having parts broken away.

FIG. 3 is a fragmentary elevation view of one of the brake shoe assemblies shown in the brake assembly of FIG. 1, taken in the direction of arrows 3—3 of that Figure and having parts broken away.

Figure 4:
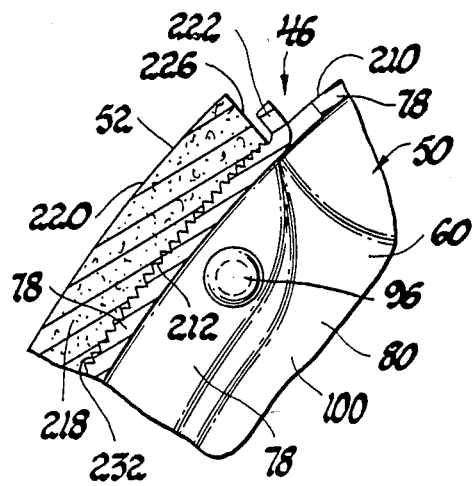
FIG. 4 is a fragmentary cross-section view of the brake shoe assembly of FIG. 1, taken in the direction of arrows 4—4 of FIG. 3.

The drum brake assembly herein disclosed and using brake shoes made by the claimed method is also disclosed in patent application Ser. Nos. 539,272 and 539,273 filed on Oct. 5, 1983 by the same inventor. The disclosures in these applications, concurrently filed with the application of which this application is a division are therefore incorporated herein by reference.

Shoe section 58 has a rim portion 62 joined at the rim portion inner edge 64 to the radially outer edge 66 of shoe web section 68. The upper end 70 of shoe 50 has a spherical end 72 formed by semi-circumferential ball ends respectively provided as parts of shoe sections 58 and 60. Shoe section 60 has a rim portion 78 and a web portion 80 similarly joined at their respective edges 82 and 84 in the same manner as the rim and web portion of shoe section 58. Web portions 68 and 80 have their upper ends 74 and 76 extending from their rim portions in a direction which, in the installed position shown in FIG. 1, is substantially parallel to the backing plate diameter 20. The web portion upper ends terminate in the ball ends earlier noted and are in themselves semi-circumferentially formed. When the web portions are fitted together to form shoe 50, their upper ends define a generally round extension 86 which terminates at spherical end 72. The lower end of shoe 50 is identically formed so that the entire shoe 50 is symmetrical about the backing plate diameter 20 when the shoe is installed as seen in FIG. 1. Thus the shoe lower end terminates in a generally round extension 88 having a spherical end 90.

Figure 5:
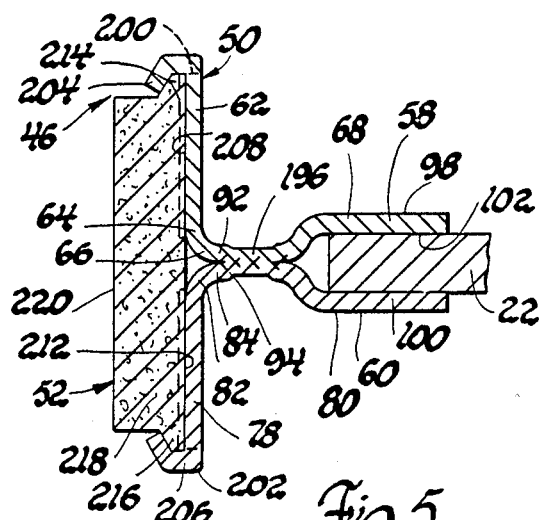
FIG. 5 is a view similar to FIG. 2 illustrating a modified form of the brake shoe assembly of FIG. 1.
Figure 6:
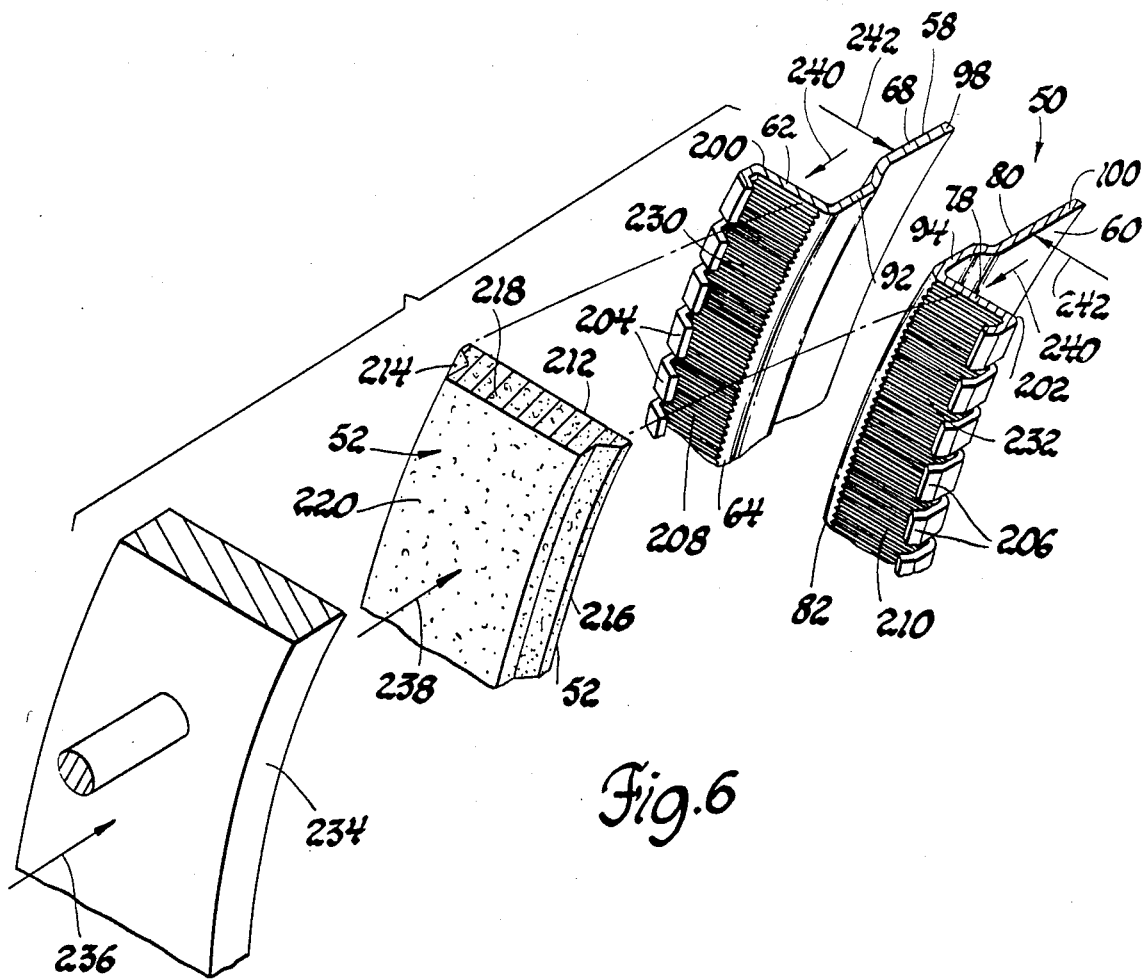
FIG. 6 is an exploded perspective view of fragmentary parts of one brake shoe assembly and includes schematic representations illustrating the method of assembly of one brake shoe assembly, with parts broken away.

The shoe web portions 68 and 80 have arcuately extending recess web parts 92 and 94 respectively positioned adjacent the web portion edges 66 and 84, as better seen in FIGS. 2, 5 and 6. When the shoe sections 58 and 60 are secured together to form shoe 50, the facing surfaces of web parts 92 and 94 are in engagement and suitable fastening means 96 are provided to hold the shoe sections together. As illustrated in FIGS. 1, 2 and 4, fastening means 96 are a series of rivets extending through matched openings formed in the webbed parts 92 and 94. Alternatively spot welds 196 may be used for this purpose, as shown in FIG. 5.

The inner parts 98 and 100 of web portions 68 and 80, respectively, are spaced apart to define a channel 102 which takes the form of an arcuate slot along the inner peripheral arc section of the shoe 50. The outer side of the web generally round extensions 86 and 88 have some material omitted so that slots 104 and 106 are provided as upper and lower extensions of channel 102. The upper slot 104 receives the arm-like extension 40 of backing plate 12 therethrough, as is illustrated in FIG. 1 in the assembled position. The web inner parts are provided with aligned openings 108 at the upper end of shoe 50 and aligned openings 110 at the lower end of that shoe. When assembled, as seen in FIG. 1, openings 108 are in alignment with the oblong opening 112 formed in backing plate 12. The oblong opening 112 is a suitably contoured sloped slot having its major axis 114 extending at an acute angle to the backing plate first diameter 18 so that, as extended, it intersects that diameter near the upper side of wheel cylinder assembly 44. A similar oblong opening 116 with its major axis 118 is provided in the portion of the backing plate containing the arcuate backing plate section 24 and arm-like extension 42. When assembled, the ends 120 and 122 of the upper retraction spring 124 extend through the upper aligned openings 108 and oblong openings 112 and 116 so that they are attached to the shoes 50 and 54 and urge the shoe upper ends toward each other. The oblong openings 112 and 116 act as cam guides for the spring ends to give a return registry for the brake shoe assemblies 46 and 48. The ends 126 and 128 of the lower retraction spring 130 extend through the lower aligned openings 110 of each shoe 50 and 54 so that spring 130 continually urges the lower ends 90 of shoe assemblies 46 and 48 toward each other.

A brake adjuster assembly 132 is received on the lower ends 90 of shoes 50 and 54. The adjuster assembly 132 includes a sleeve nut 134 and a tubular threaded member 136. Nut 134 is threaded on member 136 so that the effective length of adjuster assembly 132 may be adjusted. The nut outer end 138 fits over the generally round extension 88 of the lower end 90 of shoe 50 and abuts a portion of the shoe web as illustrated in FIG. 1. The inner end of sleeve nut 134 has a toothed wheel 140 formed thereon. This wheel is commonly referred to as a star wheel. It may suitably engaged by a brake adjusting linkage (not shown) of any suitable type of automatic brake adjustment. It is also accessible to be turned with a manual brake adjusting tool, as is well known. The outer end 142 of tubular threaded member 136 is slotted so as to receive parts of the shoe web inner portions after fitting over the generally round extension 88 forming the bottom end of brake shoe 54. Thus threaded member 136 is prevented from rotation during brake adjustment.

A spreader bar 144 is engaged in notches in the shoe webs and arranged to be actuated by suitable linkage 146 to mechanically apply the brake as a parking brake. When the parking brake is actuated, the effective length of the spreader bar is increased by moving sections thereof in opposite directions so that the brake shoe assemblies are moved in a brake apply direction.

The wheel cylinder assembly 44 is more completely disclosed in Application Ser. No. 539,272 noted above. The wheel cylinder body 148 has a cylinder 150 formed therethrough. Opposed pistons 152 and 154 are sealingly and reciprocably received in cylinder 150 and have sockets formed in their outer ends which receive the spherical ends 72 of each of the shoes 50 and 54. The pressure chamber 156, formed by the pistons and the cylinder, is arranged to receive brake actuating fluid, as is well known in the art. The cylinder body ends are provided with notches 158 and 160 so that notches 158 receive the side edge 36 of arm-like extension 40 and notches 160 receive the side edge 38 of extension 42.

In order to assemble the brake, the upper ends of the brake shoe assemblies are positioned so that they engage the wheel cylinder pistons. The shoe assemblies and the wheel cylinder assembly are then moved downwardly over the backing plate 12 so that the wheel cylinder assembly is located in notch 32 and channels 102 and slots 104 of the brake shoe assemblies 46 and 48 fit over the backing plate. The upper retractor spring 124 is installed with spreader bar 144 in position. The adjuster assembly 132 is positioned between the shoe assembly lower ends as shown and the lower retraction spring 130 is installed. The assembly is then complete. It will be retained in its assembled position by the retraction springs before the assembly is attached to the vehicle so that it may be handled as a unit.

During brake operation, the brake shoe assemblies, the adjuster assembly and the wheel cylinder assembly are permitted to move appropriately as needed in the plane of the backing plate so that their positions adjust during brake actuation and release as well as for brake adjustment. It can be seen that the shoes are not enclosed within the brake drum by the backing plate, but are instead much more open than the typical passenger car drum brake currently in use, contributing to improve brake cooling. As is illustrated in application Ser.

No. 539,273 noted above, the lower portion of the backing plate 12 may not be completely cut away, but will still give access to cooling air during braking.

If it is desired to provide a fixed anchor arrangement, lower backing plate extensions may be provided which are symmetrically identical to the upper extensions 40 and 42, extending in the same manner through the lower ends of the brake shoes. This will provide leading/trailing brakes instead of duo-servo brakes. The adjuster assembly 132 is installed in the same manner as wheel cylinder assembly 44 to provide adjustment. If it is desired to use twin cylinder actuation, a second wheel cylinder assembly is used instead of the adjuster assembly 132, with the lower backing plate extensions discussed above.

The brake shoe assemblies made by the method to which the invention is particularly directed are illustrated in greater detail in FIGS. 2 through 6. Since both brake shoe assemblies are constructed in the same manner, these Figures and the following description shows and describes only one of the brake shoe assemblies but applies equally to both.

The rim sections 62 and 78 of brake shoe 50 are in a common curvilinear surface inside and corresponding to the brake drum with which the brake shoe assembly is associated. Their outer edges 200 and 202 are respectively provided with a series of arcuately spaced tabs 204 and 206. These tabs extend radially outward and are then bent toward the center of shoe 50 so that they form acute angles with the outer surfaces 208 and 210 of rim sections 62 and 78. The lining segment 52 has its curved inner surface 212 extending across the combined widths of of surfaces 208 and 210 and has flanges 214 and 216 which extend under the ends of tabs 204 and 206, respectively. The main body 218 of lining segment 52 extends radially outward from shoe 50 so that a substantial part of the lining segment is also radially outward of any portion of tabs 204 and 206 when the lining is new. The lining segment curved outer surface 220 forms the friction braking surface of shoe assembly 46. End locating tabs 222 and 224 are struck out of rim sections 62 and 78 so that they engage, or are at least closely adjacent, the lining segment ends 226 and 228, respectively. Those tabs 222 and 224 insure against excessive slippage of lining segment 52 on shoe 50 in either arcuate direction if the other provisions for lining retention and adhesion do not maintain the lining segment in position.

Surfaces 208 and 210 of the rim sections are provided with laterally extending serrations 230 and 232 respectively, as particularly illustrated in FIGS. 4 and 6. Serrations 230 and 232 preferably extend from the outer edges 200 and 202 to the inner edges 64 and 82 of the rim sections 62 and 78. Because of the assembly procedures to be described below, it is important that serrations 230 and 232 extend perpendicularly to the shoe web sections 68 and 80 and are on lines which, extend beyond the rim sections, are parallel.

Referring more particularly to FIG. 6, the preferred method of assembling each brake shoe assembly is schematically illustrated. Brake shoe sections 58 and 60 are suitably mounted in a fixture (not shown) which accepts the shoe sections in laterally spaced relation so that the rim section inner edges 64 and 82 are only slightly closer together than the width of lining segment surface 212. The shoe sections are held in this position while the brake lining segment 52 is positioned over the space between the shoe sections as illustrated in FIG. 6, so that the edges of lining segment surface 212 engage the inner portions of serrations 208 and 210. A platen 234, illustrated schematically in FIG. 6, engages the outer surface 220 of lining segment 52 and a force represented by arrow 236 is exerted on platen 234. This force is transmitted by that platen to brake lining segment 52 as schematically represented by arrow 238. The portion of lining segment surface 212 engaging serrations 230 and 232 are pushed slightly into the groove portions of the serrations and the raised portions of the serrations in turn form grooves in the lining segment surface. The force represented by arrow 238 is balanced by forces from the fixture holding the shoe sections. These forces being represented by arrows 240.

The force exerted by platen 234 is maintained while transversely acting forces represented by arrows 242 are respectively exerted on shoe sections 58 and 60, moving the shoe sections towards each other while maintaining their radial relationship with lining segment 52. As this movement takes place, serrations 230 and 232 form mating serration grooves across lining segment surface 212, creating a large total surface area opposing any arcuate movement of the lining segment on the assembled brake shoe 50. This is shown somewhat schematically in FIG. 4.

When the arcuate recessed portions 92 and 94 of web sections 68 and 80 engage each other, the shoe sections 58 and 60 are secured together. If rivets are to be used as the securing means, the rivets are installed as illustrated in FIGS. 1 and 2. Other securing means may be used. By way of example, FIG. 5 illustrates the use of spot welds 196 in place of rivets. The spot welding equipment may be integrated into the fixture holding the shoe sections 58 and 60 in position and exerting forces 240 and 242 thereon. If spot welds are to be used, appropriate bumps may be provided in spaced positions on recessed portions 92 and 94 to initially engage each other and permit spot welding action to occur at desired points along the shoe web. While the shoe sections 58 and 60 are being moved into engagement and secured together, the flanges 214 and 216 of lining segment 52 are fitted tightly under tabs 204 and 206 so that these tabs retain the lining segment in position on the shoe with the serrations 230 and 232 tightly mating with the serrations formed on lining segment surface 212 during the assembly operation. The effective area created by use of the serrations is substantially large and easily transmits all friction braking forces, generated during braking operation, from the lining segment to the brake shoe. This effective area may be a much larger total area than that provided by a series of lining segment rivets, for example. The arrangement also eliminates the need for adhesives to hold the lining segments in place when rivets are not used. The outer ends of tabs 204, 206, 222 and 224 are in position so that when sufficient brake lining wear occurs to warrant replacement, one or more of the tab ends will engage the brake drum during brake actuation and create a substantial noise to warn the vehicle operator of the lining wear.

The embodiments of the invention in which an exclusive property or privilege is claimed are defined as follows:

1. A method of making a brake shoe and lining assembly comprising the steps of:
    (a) providing a formed lining segment having opposite edges;
    (b) providing a pair of brake shoe sections, each having a rim portion and a web portion, serrations transversely formed on the rim portion surface which is to be supportive of the lining segment, and reversely bent tab means on the outer edge of the rim portion;
- (c) mounting the pair of brake shoe sections in laterally spaced and aligned relation;
- (d) placing the lining segment on the laterally spaced supportive rim portion surfaces so that the lining segment is engaged with the rim portion transverse serrations only adjacent the lining segment edges;
- (e) forcing the lining segment into the rim portion surfaces to initiate formation of transversely extending complementary mating serrations in the surface of the lining segment engaging the rim portion, and holding the lining segment in place;
- (f) moving the shoe sections laterally together, causing the rim portion serrations to form the transversely extending complementary mating serrations through the lining segment surface engaging the rim portions and further causing the lining segment edges to be engaged by the tab means on the outer edges of the rim portions in holding and retaining relation; and
- (g) securing the shoe sections together in the web portions to form the brake shoe and hold the lining segment in position thereon by the tab means and the mating serrations.

2. A method of making a brake shoe and lining assembly comprising the steps of:
- (a) providing a formed lining segment having opposite edges;
- (b) providing a pair of identical and symmetrical brake shoe sections, each having a rim portion and a web portion, serrations transversely formed on the rim portion surface which is to be supportive of the lining segment, and reversely bent tab means on the outer edge of the rim portion;
- (c) mounting the pair of identical and symmetrical brake shoe sections in opposed spaced and aligned relation;
- (d) placing the lining segment on the laterally spaced supportive rim portion surfaces so that the lining segment is engaged with the rim portion transverse serrations only adjacent the lining segment edges;
- (e) forcing the lining segment into the rim portion surfaces to initiate formation of transversely extending complementary mating serrations in the surface of the lining segment engaging the rim portion, and holding the lining segment in place;
- (f) moving the shoe sections laterally together, causing the rim portion serrations to form the transversely extending complementary mating serrations through the lining segment surface engaging the rim portion and further causing the lining segment edges to be engaged by the tab means on the outer edges of the rim portions in holding and retaining relation; and
- (g) securing the shoe sections together in the web portions to form the brake shoe with a rim made of the rim portions and a web made of the web portions and to hold the lining segment in position on the rim by the tab means and the mating serrations.

3. A method of making a brake shoe and lining assembly comprising the steps of:
- (a) providing a formed lining segment having opposite edges;
- (b) providing a pair of brake shoe sections, each having a rim portion and a web portion, serrations transversely formed on the rim portion surface which is to be supportive of the lining segment, and reversely bent tab means on the outer edge of the rim portion;
- (c) mounting the pair of brake shoe sections in laterally spaced and aligned relation;
- (d) placing the lining segment on the laterally spaced supportive rim portion surfaces so that the lining segment is engaged with the rim portion transverse serrations only adjacent the lining segment edges;
- (e) forcing the lining segment into the rim portion surfaces to initiate formation of transversely extending complementary mating serrations in the surface of the lining segment engaging the rim portion, and holding the lining segment in place;
- (f) moving the shoe sections laterally together, causing the rim portion serrations to form the transversely extending complementary mating serrations through the lining segment surface engaging the rim portion and further causing the lining segment edges to be engaged by the tab means on the outer edges of the rim portions in holding and retaining relation; and
- (g) welding the shoe sections together in the web portions to form the brake shoe and hold the lining segment in position thereon by the tab means and the mating serrations.

4. A method of making a brake shoe and lining assembly comprising the steps of:
- (a) providing a formed lining segment having opposite edges;
- (b) providing a pair of brake shoe sections, each having a rim portion and a web portion, serrations transversely formed on the rim portion surface which is to be supportive of the lining segment, and reversely bent tab means on the outer edge of the rim portion;
- (c) mounting the pair of brake shoe sections in laterally spaced and aligned relation;
- (d) placing the lining segment on the laterally spaced supportive rim portion surfaces so that the lining segment is engaged with the rim portion transverse serrations only adjacent the lining segment edges;
- (e) forcing the lining segment into the rim portion surfaces to initiate formation of transversely extending complementary mating serrations in the surface of the lining segment engaging the rim portion, and holding the lining segment in place;
- (f) moving the shoe sections laterally together, causing the rim portion serrations to form the transversely extending complementary mating serrations through the lining segment surface engaging the rim portions and further causing the lining segment edges to be engaged by the tab means on the outer edges of the rim portions in holding and retaining relation; and
- (g) mechanically securing the shoe sections together by rivets or the like in the web portions to form the brake shoe and hold the lining segment in position thereon by the tab means and the mating serrations.

* * * * *